(12) United States Patent
Yang (10) Patent No.: US 8,737,450 B2
(45) Date of Patent: May 27, 2014

(54) HIGH SPEED SERIAL LINK SYSTEMS

(75) Inventor: Shun-Cheng Yang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1304 days.

(21) Appl. No.: 12/550,475

(22) Filed: Aug. 31, 2009

(65) Prior Publication Data

US 2011/0002368 A1     Jan. 6, 2011

(30) Foreign Application Priority Data

Jul. 6, 2009   (TW) .............................. 98122733 A (51) Int. Cl.
*H04B 1/00* (2006.01)
(52) U.S. Cl.
USPC ........... 375/146; 327/127; 327/266; 327/274; 327/280
(58) Field of Classification Search
None
See application file for complete search history.

(56) References Cited

U.S. PATENT DOCUMENTS

2009/0201083 A1 * 8/2009 Guanziroli et al. ............. 330/10

FOREIGN PATENT DOCUMENTS

| JP | 2009-105858 | | 5/2009 |
|---|---|---|---|
| JP | 2009105858 | * | 5/2009 |
| TW | 200822537 | | 5/2008 |

OTHER PUBLICATIONS

English language translation of abstract of TW 200822537 (published May 16, 2008).
Chinese language office action dated Jun. 23, 2011.
English language translation of abstract of JP 2009-105858 (published May 14, 2009).

* cited by examiner

*Primary Examiner* — Adolf Dsouza
(74) *Attorney, Agent, or Firm* — McClure, Qualey & Rodack, LLP (57) ABSTRACT

High speed serial link techniques are provided. A system applying the high speed serial link technique comprises a relay unit and an amplifier. The relay unit receives a first pair of differential signals provided by a high speed transmitter of a first device, and provides the amplifier with at least one signal that is generated based on the first pair of differential signals. The amplifier amplifies and converts the signal provided by the relay unit to a second pair of differential signals to be received by a high speed receiver of a second device.

9 Claims, 7 Drawing Sheets

HIGH SPEED SERIAL LINK SYSTEMS

CROSS REFERENCE TO RELATED APPLICATIONS

This Application claims priority of Taiwan Patent Application No. 098122733, filed on Jul. 6, 2009, the entirety of which is incorporated by reference herein.

BACKGROUND OF THE INVENTION

1. Field of the Invention

The present invention relates to high speed serial link techniques.

2. Description of the Related Art

High speed serial link techniques, such as SATA (serial advanced technology attachment), PCIe (peripheral component interconnect express), USB (universal serial bus) and so on, typically use a pair of differential signals to convey data. Cables adopted in this art typically comprise at least two transmission lines for conveying the pair of differential signals.

However, precise cables are required for high speed differential signal transmission. To ensure transmission reliability, the two transmission lines conveying the pair of differential signals are expected to have identical characteristics, for example, identical lengths or identical transmission abilities.

BRIEF SUMMARY OF THE INVENTION

The invention discloses high speed serial link systems.

An exemplary embodiment of the high speed serial link system comprises a relay unit and an amplifier.

The relay unit receives a first pair of differential signals provided by a high speed transmitter of a first device, and provides the amplifier with at least one signal. The amplifier amplifies and converts the signal, provided by the relay unit, to a second pair of differential signals to be received by a high speed receiver of a second device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
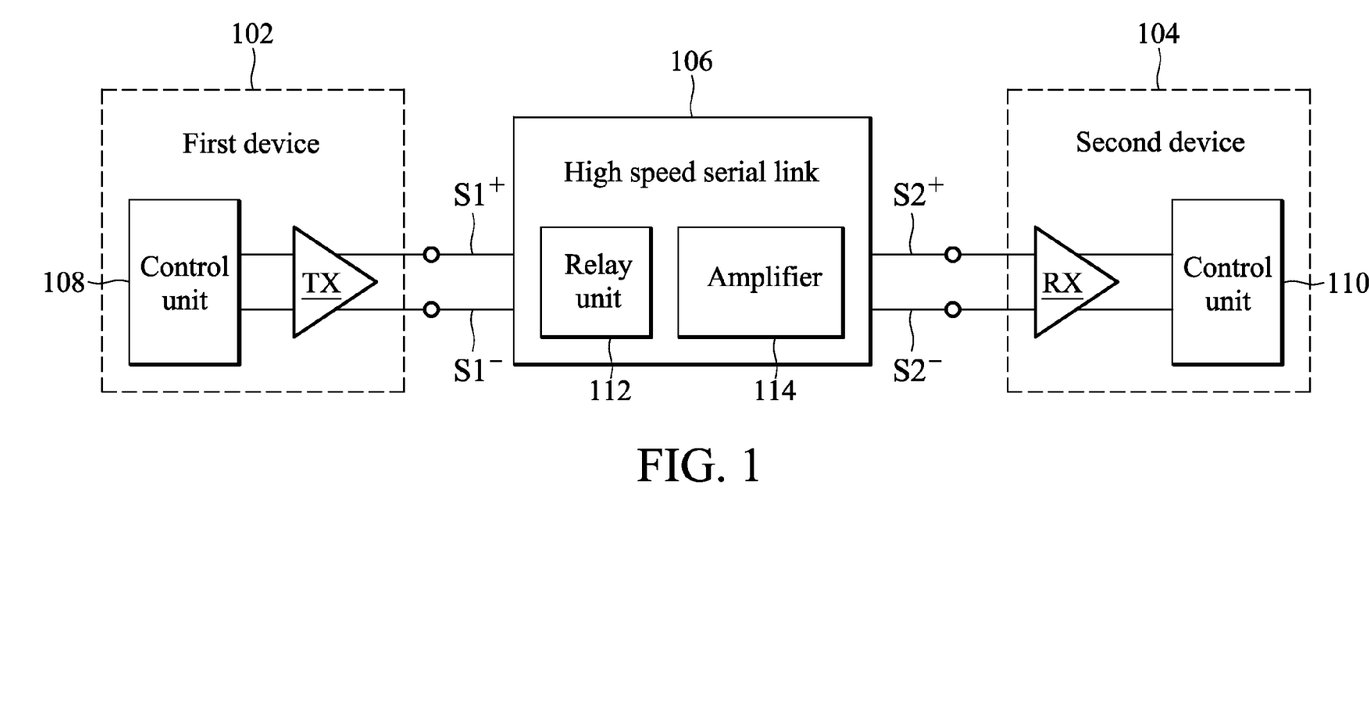
FIG. 1 shows a block diagram depicting an exemplary embodiment of the high speed serial link technique of the invention.

FIG. 1 shows a block diagram depicting an exemplary embodiment of the high speed serial link technique of the invention. FIG. 1 shows a first device 102, a second device 104, and a high speed serial link 106 therebetween. The figures of the invention only show the transmission from the first device 102 to the second device 104 and not vice versa for simplicity. The transmission, from the second device 104 to the first device 102, may use the same technique as that from the first device 102 to the second device 104.

The first device 102 comprises a high speed transmitter TX and a control unit 108. Under the control of the control unit 108, the high speed transmitter TX transmits a first pair of differential signals including a positive signal $S1^+$ and a negative signal $S1^-$. The data in the first pair of differential signals $S1^+$ and $S1^-$ are conveyed to the second device 104 by the high speed serial link 106.

The high speed serial link 106 comprises a relay unit 112 and an amplifier 114. The relay unit 112 receives the first pair of differential signals $S1^+$ and $S1^-$ to provide at least one signal to the amplifier 114. The amplifier 114 amplifies and converts the signal, provided by the relay unit 112, to a second pair of differential signals including a positive signal $S2^+$ and a negative signal $S2^-$.

The second device 104 comprises a high speed receiver RX and a control unit 110. Under the control of the control unit 110, the high speed receiver RX receives the second pair of differential signals $S2^+$ and $S2^-$. The control unit 110 may process the data received by the high speed receiver RX.

Figure 2:
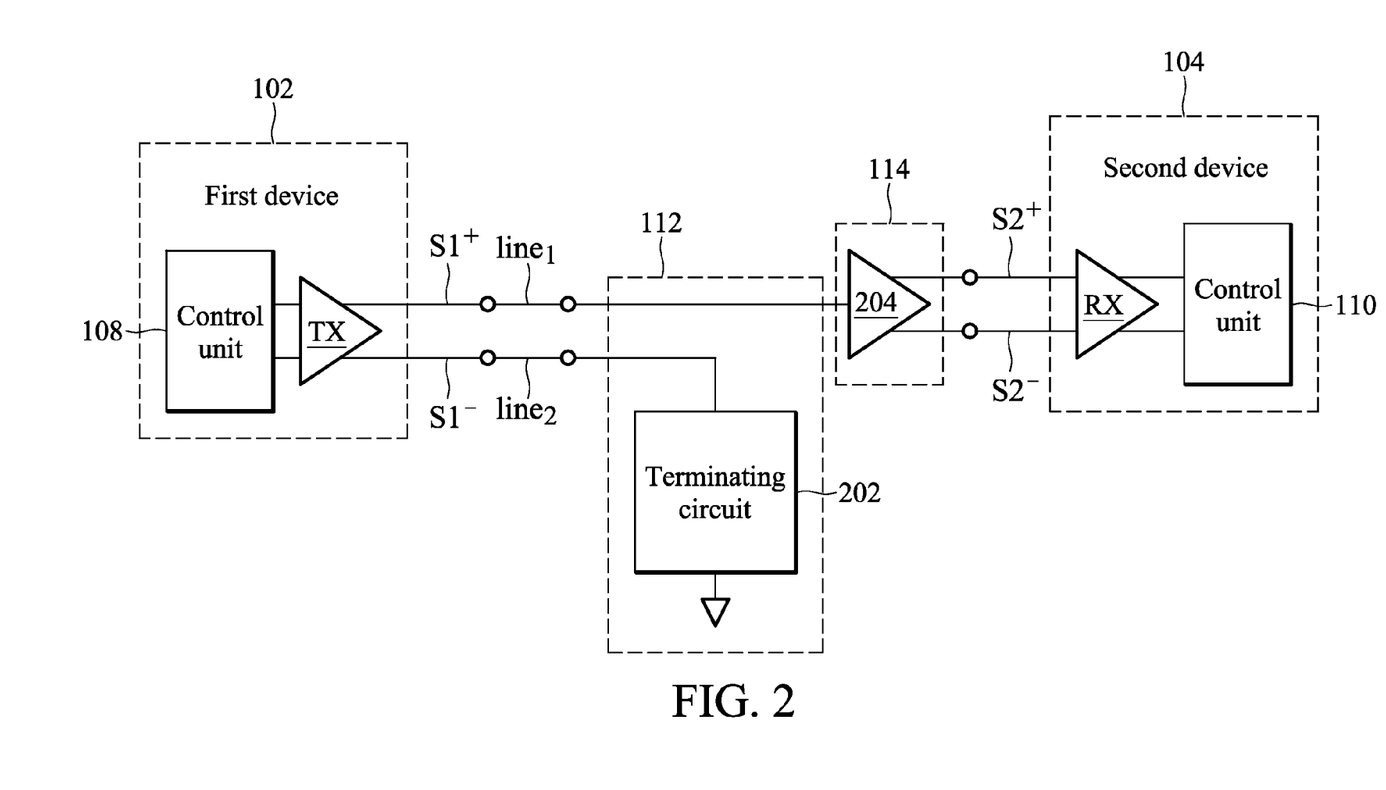
FIGS. 2, 3A and 3B depict other exemplary embodiments of the invention.

FIG. 2 depicts another exemplary embodiment of the high speed serial link technique of the invention. Compared with FIG. 1, FIG. 2 further discloses a first transmission line $line_1$ and a second transmission line $line_2$ which separately convey the positive signal $S1^+$ and the negative signal $S1^-$ of the first pair of differential signals to the relay unit 112. The relay unit 112 electrically couples the first transmission line $line_1$ to the amplifier 114. Furthermore, the relay unit 112 comprises a terminating circuit 202, which couples the second transmission line $line_2$ to ground. The terminating circuit 202 may be a resistor (for example, a 50 ohm resistor).

In FIG. 2, the amplifier 114 is realized by a single in differential out amplifier 204, which provides an adjustable gain and improves the intensity of the second pair of differential signals ($S2^+$ and $S2^-$).

The relay unit 112 and the amplifier 114 shown in FIG. 2 may form a signal processing device to be assembled on the second device 104. In some embodiments, the signal processing device (including the relay unit 112 and the amplifier 114) may be combined with the second device 104 to form an electronic product or integrated chip.

Furthermore, the first transmission line $line_1$, second transmission line $line_2$, relay unit 112 and amplifier 114 may be applied in a high speed serial link cable to accomplish one way transmission thereof.

Figure 3A:
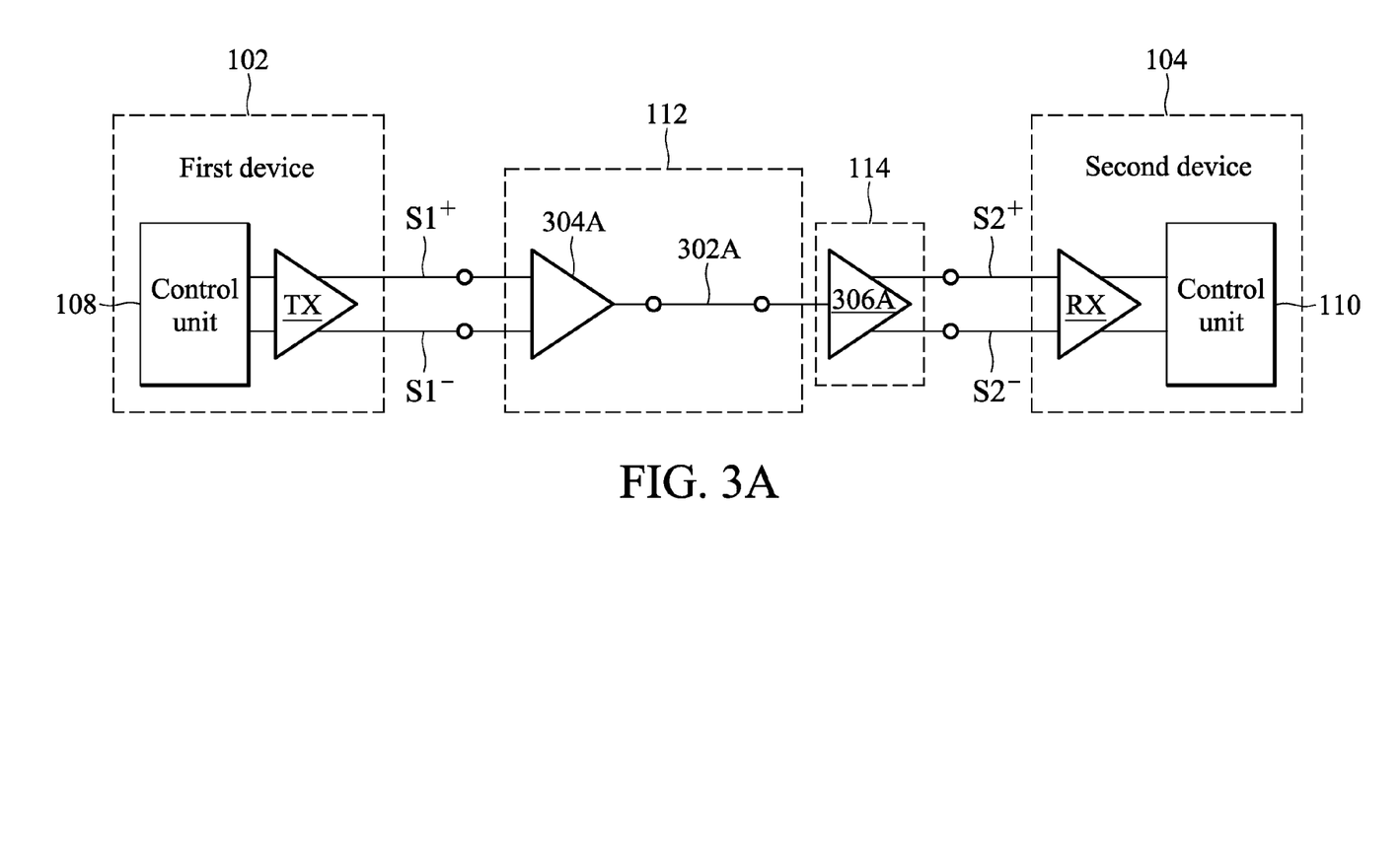

FIG. 3A depicts another exemplary embodiment of the high speed serial link technique of the invention. As shown, the relay unit 112 comprises a transmission line 302A and a differential in single out amplifier 304. The differential in single out amplifier 304A is coupled to the high speed transmitter TX to receive the first pair of the differential signals $S1^+$ and $S1^-$ and, according to the received signals $S1^+$ and $S1^-$, the differential in single out amplifier 304A outputs a single end signal to be conveyed to the amplifier 114. In this embodiment, the amplifier 114 is realized by a single in differential out amplifier 306A which may have an adjustable gain and can improve the intensity of the second pair of differential signals $S2^+$ and $S2^-$.

The differential in single out amplifier 304A, the transmission line 302A and the single in differential out amplifier 306A may be applied in a high speed serial link cable to accomplish one way transmission thereof.

In other exemplary embodiments, the single in differential out amplifier 306A is applied to a signal processing device to be assembled on the second device 104. The signal processing device (including the single in differential out amplifier 306A) may be combined with the second device 104 as an electronic product or integrated chip. Furthermore, the differential in single out amplifier 304A and the transmission line 302A may be applied in a high speed serial link cable to convey the first pair differential signals $S1^+$ and $S1^-$ to the signal processing device comprising the single in differential out amplifier 306A.

In other embodiments, the differential in single out amplifier 304A may be applied to a first signal processing device to be assembled on the first device 102, and the single in differential out amplifier 306A may be applied to a second signal processing device to be assembled on the second device 104. In this embodiment, the transmission line 302A is applied in a high speed serial link cable to link the first and second signal processing devices (realized by the amplifiers 304A and 306A, respectively). In some embodiments, the first signal processing device (realized by the differential in single out amplifier 304A) is combined with the first device 102 to form an electronic device or integrated chip. The second signal processing device (realized by the single in differential out amplifier 306A) may be combined with the second device 104 to form another electronic device or integrated chip.

Figure 4:
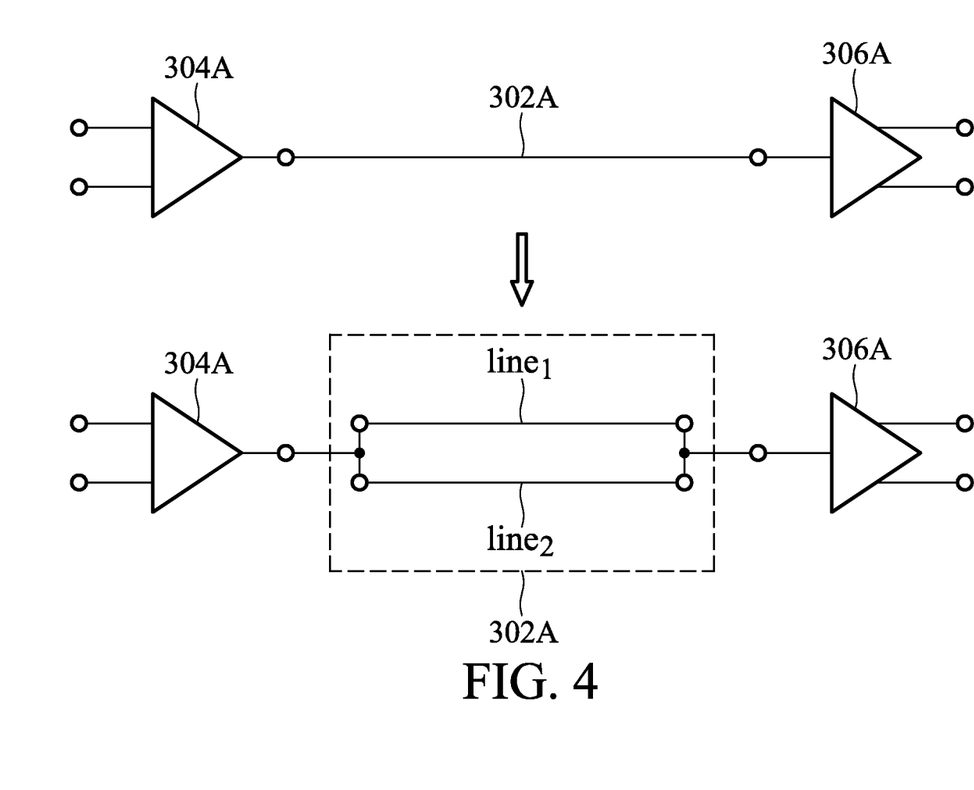
FIG. 4 shows an exemplary embodiment of the transmission line 302A of FIG. 3A.

FIG. 4 shows an exemplary embodiment of the transmission line 302A. In this figure, the transmission line 302A is realized by a pair of transmission lines $line_1$ and $line_2$ of a typical high speed serial link cable. As shown, to work as a single transmission line, the input terminals of the transmission lines $line_1$ and $line_2$ are short together, and the output terminals of the transmission $line_1$ and $line_2$ are short together.

Figure 3B:
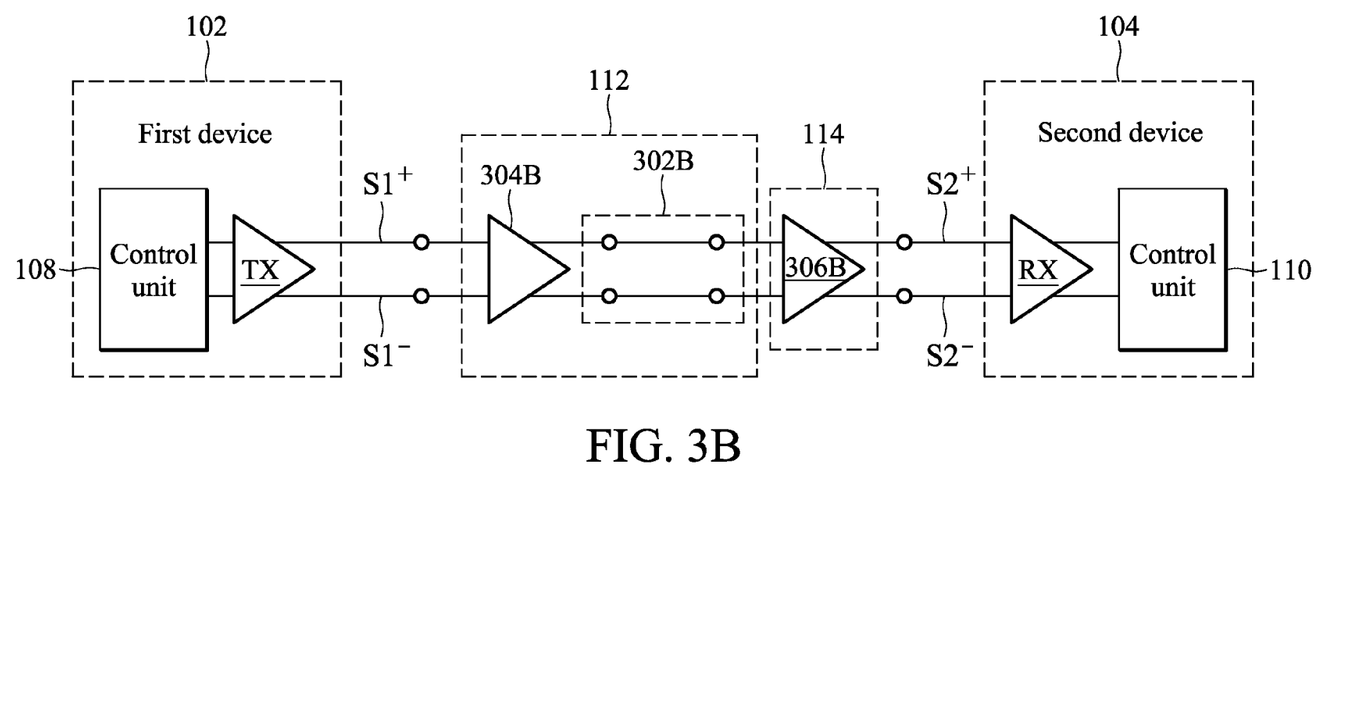

FIG. 3B depicts another exemplary embodiment of the high speed serial link technique of the invention. As shown, the relay unit 112 is realized by a pair of transmission lines 302B and a first differential in differential out amplifier 304B. The first differential in differential out amplifier 304B is coupled to the high speed transmitter TX to receive the first pair of differential signals $S1^+$ and $S1^-$. Based on the first pair of differential signals $S1^+$ and $S1^-$, the first differential in differential out amplifier 304B generates a pair of relay differential signals to be transmitted to the amplifier 114, wherein the pair of relay differential signals is conveyed by the pair of transmission lines 302B. The amplifier 114 may be realized by a second differential in differential out amplifier 306B which provides an adjustable gain and improves the intensity of the second pair of differential signals $S2^+$ and $S2^-$.

The first differential in differential out amplifier 304B and the pair of transmission lines 302B and the second differential in differential out amplifier 306B of FIG. 3B may be applied in a high speed serial link cable to accomplish one way transmission thereof.

In other embodiments, the second differential in differential out amplifier 306B may be applied to a signal processing device to be assembled on the second device 104. In some embodiments, the signal processing device (including the second differential in differential out amplifier 306B) may be combined with the second device 104 to form an electronic device or integrated chip. Furthermore, The first differential in differential out amplifier 304B and the pair of transmission lines 302B may be applied in a high speed serial link cable to convey the first pair of differential signals $S1^+$ and $S1^-$ from the first device 102 to the signal processing device realized by the second differential in differential out amplifier 306B.

In another embodiment, the first differential in differential out amplifier 304B may be applied to a first signal processing device to be assembled in the first device 102 and the second differential in differential out amplifier 306B may be applied to a second signal processing device to be assembled on the second device 104, and the pair of transmission lines 302B may be part of a high speed serial link cable which couples the first and second signal processing devices (realized by the amplifiers 304B and 306B, respectively.) The first signal processing device (including the differential in differential out amplifier 304B) may be combined with the first device 102 to form an electronic product or integrated chip. The second signal processing device (including the second differential in differential out amplifier 306B) may be combined with the second device 104 to form another electronic product or integrated chip.

Figure 5A:
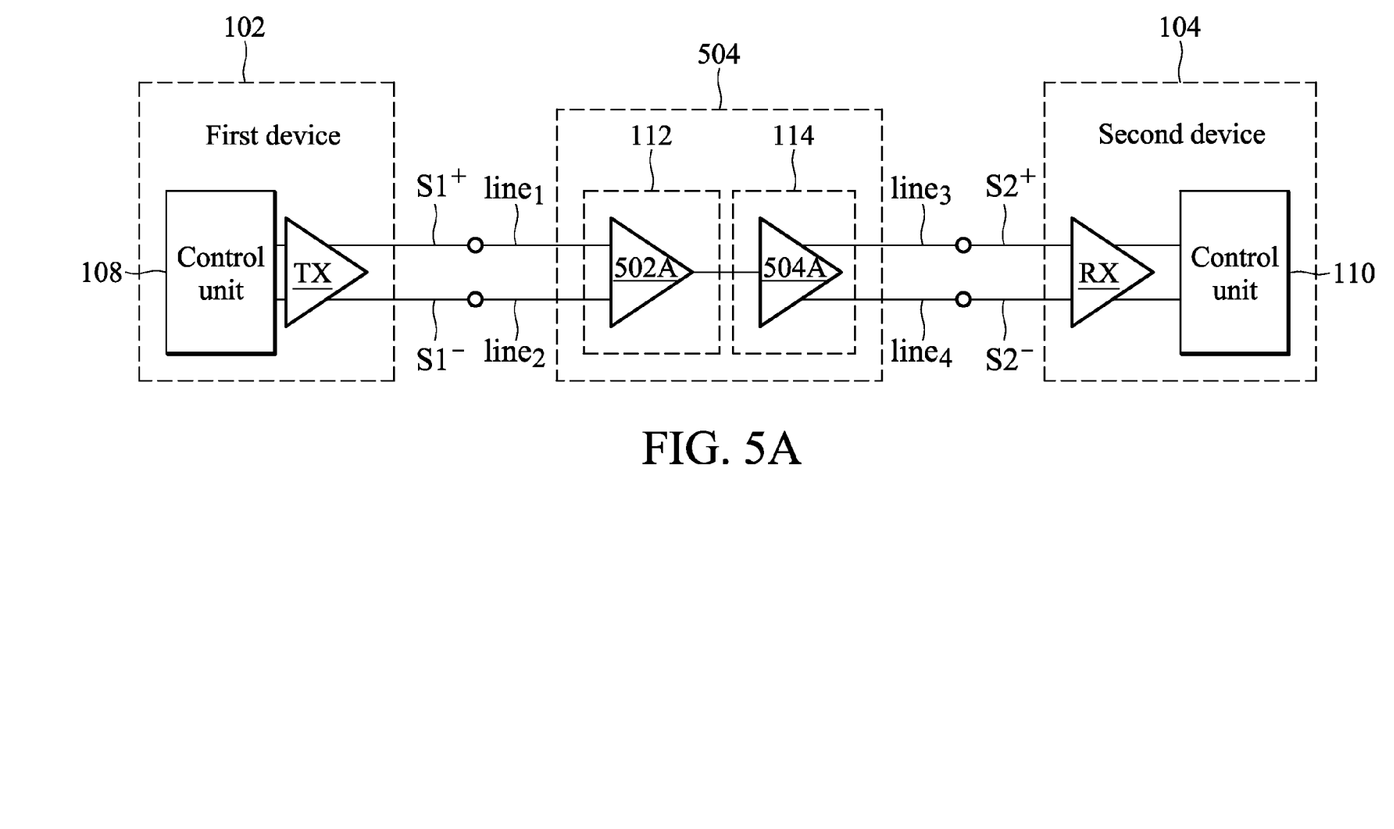
FIGS. 5A and 5B depict other exemplary embodiments of the invention.

FIG. 5A depicts another exemplary embodiment of the high speed serial link technique of the invention. The relay unit 112 is realized by a differential in single out amplifier 502A, and the amplifier 114 is a single in differential out amplifier 504A. In this embodiment, a first transmission line $line_1$, a second transmission line $line_2$, a third transmission line $line_3$ and a fourth transmission line $line_4$ are disclosed. The first and second transmission lines $line_1$ and $line_2$ convey the first pair of differential signals $S1^+$ and $S1^-$, provided by the high speed transmitter TX, to the differential in single out amplifier 502A. The third and fourth transmission lines $line_3$ and $line_4$ convey the second pair of differential signals $S2^+$ and $S2^-$, generated by the single in differential out amplifier 504A, to the high speed receiver RX of the second device 104. The gain of the single in differential out amplifier 504A may be adjustable and the single in differential out amplifier 504A can improve the intensity of the second pair of differential signals $S2^+$ and $S2^-$.

The differential in single out amplifier 502A and the single in differential out amplifier 504A may form a signal processing device 504 and may be manufactured into products. The first and second transmission lines $line_1$ and $line_2$ may be applied in a first high speed serial link cable. The third and fourth transmission lines $line_3$ and $line_4$ may be applied in a second high speed serial link cable.

In another exemplary embodiment, the first, second, third and fourth transmission lines $line_1$, $line_2$, $line_3$ and $line_4$ and the differential in single out amplifier 502A and the single in differential out amplifier 504A may be applied in a high speed serial link cable to accomplish one way transmission thereof.

Figure 5B:
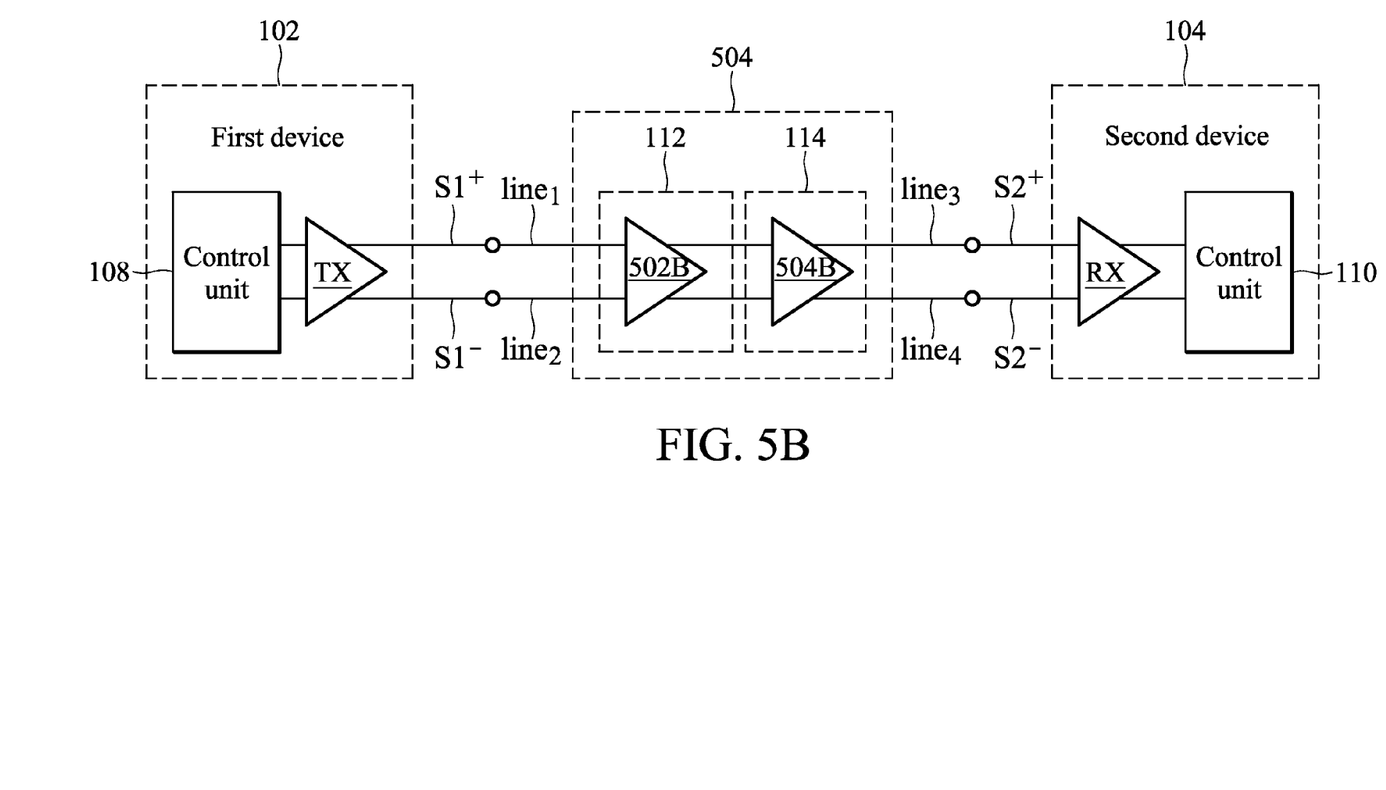

FIG. 5B depicts another exemplary embodiment of the high speed serial link technique of the invention. Compared with FIG. 5A, the differences are the relay unit 112 and the amplifier 114. In FIG. 5B, the relay unit 112 is realized by a first differential in differential out amplifier 502B and the amplifier 114 is realized by a second differential in differential out amplifier 504B. The first and second transmission lines $line_1$ and $line_2$ convey the first pair of differential signals $S1^+$ and $S1^-$, provided by the high speed transmitted TX, to the first differential in differential out amplifier 502B. The first differential in differential out amplifier 502B converts the first pair of differential signals $S1^+$ and $S1^-$ to a pair of relay differential signals to be sent to the second differential in differential out amplifier 504B. The second differential in differential out amplifier 504B converts the pair of relay differential signals to the second pair of differential signals $S2^+$ and $S2^-$. The third and fourth transmission lines $line_3$ and line$_4$ convey the second pair of differential signals S2$^+$ and S2$^-$ to the high speed receiver RX of the second device 104. The gain of the second differential in differential out amplifier 504B may be adjustable and the second differential in differential out amplifier 504B can improve the intensity of the second pair of differential signals S2$^+$ and S2$^-$.

The first and second differential in differential out amplifiers 502B and 504B of FIG. 5B may form a signal processing device 504 to be manufactured into products. The first and second transmission lines line$_1$ and line$_2$ may be applied in a first high speed serial link cable. The third and fourth transmission lines line$_3$ and line$_4$ may be applied in a second high speed serial link cable.

In another embodiment, the first, second, third and fourth transmission lines line$_1$, line$_2$, line$_3$ and line$_4$, and the first and second differential in differential out amplifiers 502B and 504B of FIG. 5B may be applied in a high speed serial link cable to accomplish one way transmission thereof.

The aforementioned transmission lines may be realized by various techniques. For example, they may be realized by the typical cables for high speed serial link transmissions. Or, they may be realized by electronic wires or PCB traces and so on.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A high speed serial link system, comprising:
a relay unit, receiving a first pair of differential signals from a high speed transmitter of a first device and, according to the first pair of differential signals, providing a single in differential out amplifier with a single end signal;
the single in differential out amplifier, coupled to the relay unit and amplifying and converting the single end signal from the relay unit to a second pair of differential signals to be received by a high speed receiver of a second device and
a high speed serial link cable, comprising a first transmission line and a second transmission line,
wherein:
the first and second transmission lines respectively convey a positive signal and a negative signal of the first pair of the differential signals to the relay unit;
the relay unit electrically couples the first transmission line to the single in differential out amplifier; and
the relay unit further comprises a terminating circuit coupling the second transmission line to ground.

2. The system as claimed in claim 1, wherein:
the high speed serial link cable further comprising the relay unit and the single in differential out amplifier.

3. The system as claimed in claim 1, further comprising:
a signal processing device, comprising the relay unit and the single in differential out amplifier, and designed to be assembled on the second device.

4. The system as claimed in claim 3, wherein:
the high speed serial link cable further comprises single in differential out amplifier.

5. The system as claimed in claim 3, further comprising:
a signal processing device, comprising the single in differential out amplifier and designed to be assembled in the second device.

6. A high speed serial link system, comprising:
a relay unit, receiving a first pair of differential signals from a high speed transmitter of a first device and, according to the first pair of differential signals, providing a single in differential out amplifier with a single end signal;
the single in differential out amplifier, coupled to the relay unit and amplifying and converting the single end signal from the relay unit to a second pair of differential signals to be received by a high speed receiver of a second device; and
a high speed serial link cable, comprising the relay unit,
wherein the relay unit comprises:
a transmission line; and
a differential in single out amplifier, coupled to the high speed transmitter to receive the first pair of differential singles, generating the single end signal to be conveyed to the single in differential out amplifier by the transmission line.

7. A high speed serial link system, comprising:
a relay unit, receiving a first pair of differential signals from a high speed transmitter of a first device and, according to the first pair of differential signals, providing a single in differential out amplifier with a single end signal;
the single in differential out amplifier, coupled to the relay unit and amplifying and converting the single end signal from the relay unit to a second pair of differential signals to be received by a high speed receiver of a second device;
wherein, the relay unit comprises a differential in single out amplifier coupled to the high speed transmitter for the first pair of differential signals; and
the system comprises a signal processing device comprising the relay unit and the single in differential out amplifier, wherein:
the single in differential out amplifier receives the single end signal outputted from the differential in single out amplifier of the relay unit; and
the signal processing device is coupled to the high speed transmitter by a first transmission line and a second transmission line which convey the first pair of differential signals from the high speed transmitter to the differential in single out amplifier of the relay unit, and is coupled to the high speed receiver by a third transmission line and a fourth transmission line which convey the second pair of differential signals to the high speed receiver.

8. The system as claimed in claim 7, further comprising:
a first high speed serial link cable, comprising the first and second transmission lines; and
a second high speed serial link cable, comprising the third and fourth transmission lines.

9. The system as claimed in claim 7, comprising:
a high speed serial link cable, comprising the first, second, third and fourth transmission lines and the signal processing device.

* * * * *